(12) United States Patent
Gadoury et al.

(10) Patent No.: US 8,412,840 B2
(45) Date of Patent: Apr. 2, 2013

(54) LIVE MEDIA SERVING SYSTEM AND METHOD

(75) Inventors: Jean-Francois Gadoury, St-Lambert (CA); Jean-Francois Dionne, Laval (CA)

(73) Assignee: Ando Media, LLC, Montreal (CA)

( * ) Notice: Subject to any disclaimer, the term of this patent is extended or adjusted under 35 U.S.C. 154(b) by 644 days.

(21) Appl. No.: 12/153,173

(22) Filed: May 14, 2008

(65) Prior Publication Data

US 2009/0287840 A1 Nov. 19, 2009

Related U.S. Application Data

(63) Continuation-in-part of application No. PCT/CA2006/010854, filed on Nov. 14, 2006.

(60) Provisional application No. 60/735,829, filed on Nov. 14, 2005.

(51) Int. Cl.
*G06F 15/16* (2006.01)
(52) U.S. Cl. ....................................................... 709/231
(58) Field of Classification Search .......... 709/230–231, 709/246–247; 725/62–85
See application file for complete search history.

(56) References Cited

U.S. PATENT DOCUMENTS

| | | | |
|---|---|---|---|
| 5,930,473 A | 7/1999 | Teng et al. | |
| 5,999,525 A | 12/1999 | Krishnaswamy et al. | |
| 6,751,673 B2 * | 6/2004 | Shaw | 709/231 |
| 6,785,704 B1 | 8/2004 | McCanne | |
| 7,032,235 B2 * | 4/2006 | Pelkey et al. | 725/36 |
| 7,403,224 B2 * | 7/2008 | Fuller et al. | 348/231.3 |
| 7,412,531 B1 * | 8/2008 | Lango et al. | 709/231 |
| 7,428,022 B2 * | 9/2008 | Teichner et al. | 348/725 |
| 7,657,644 B1 * | 2/2010 | Zheng | 709/231 |
| 7,743,089 B2 * | 6/2010 | Putzolu | 709/202 |
| 2001/0044851 A1 * | 11/2001 | Rothman et al. | 709/231 |
| 2002/0161853 A1 * | 10/2002 | Burak et al. | 709/218 |
| 2003/0135861 A1 * | 7/2003 | Sinz et al. | 725/93 |
| 2004/0133776 A1 * | 7/2004 | Putzolu | 713/153 |
| 2004/0240541 A1 * | 12/2004 | Chadwick et al. | 375/240.01 |
| 2006/0168626 A1 * | 7/2006 | Vorlicek | 725/62 |
| 2006/0242676 A1 * | 10/2006 | Hoshino | 725/105 |
| 2011/0047566 A1 * | 2/2011 | Matuchniak et al. | 725/29 |

FOREIGN PATENT DOCUMENTS

| | | |
|---|---|---|
| CA | 2444825 A1 | 10/2002 |
| CA | 2505936 A1 | 5/2004 |

OTHER PUBLICATIONS

Schulzrinne, H., Rao, A., Lanphierand, R., Jacobson, V., 1998. Real Time Streaming Protocol (RTSP). Internet Engineering Task Force, RFC 2326.*
Fielding, R., Gettys, J., Mogul, J., Frystyk, H., Masinter, L., Leach, P., and Berners-Lee, T. 1999. IETF RFC 2616: Hypertext transfer protocol—HTTP/1.1. http://www.ietf.org/rfc/rfc2616.txt.*

* cited by examiner

*Primary Examiner* — Brendan Higa
(74) *Attorney, Agent, or Firm* — Goudreau Gage Dubuc; Hugh Mansfield (57) ABSTRACT

A method and system for transmitting a continuous live performance to a media client via a data network for rendering to a user. The method comprises acquiring the continuous live performance as a live stream of digital data and, on receiving a request from the media client to transmit the live performance, repackaging said stream of digital data into a media format compatible with the media client commencing at a current point in said live stream of digital data and transmitting said repackaged digital data to said media client via the data network. The media format comprises a data file having a virtually endless length.

13 Claims, 6 Drawing Sheets

FIG_3

FIG. 4A

FIG_5

LIVE MEDIA SERVING SYSTEM AND METHOD

CROSS REFERENCE TO RELATED APPLICATION

The present application is a Continuation in Part (CIP) of PCT Application No. PCT/CA2006/001854 filed Nov. 14, 2006 which claims priority from U.S. Provisional Application No. 60/735,829 filed Nov. 14, 2005.

FIELD OF THE INVENTION

The present invention relates to a live media serving system and method. In particular, the present invention relates to a media server which supports the rendering of live media streams on media devices and/or clients which otherwise would not be able to render a live media stream.

BACKGROUND OF THE INVENTION

Audio/video players are increasingly popular as the number of audio and video media files available on computer networks such as the internet increase.

Generally stated, two types of audio/video media are found on the Internet. Live streams and fixed length media files. In the first case, the length of the file is indefinite since it contains live audio/video feeds. In the second case, the length of the file is typically known and may be included in the header of the file.

Conventionally, different audio/video players are used to play live streams and fixed length media files. Indeed, fixed length media file readers such as, for example, Macromedia's Flash Player™, expects to find the length of the file in the header of the media file.

Furthermore, conventional audio/video players are often slow when used to play fixed length media files. This is mainly due to the fact that some audio/video players download the complete fixed length media file before starting to play the media file. Some audio/video players may have an internal buffer but also proceed to download the complete fixed length media file and at a certain point, when an internal buffer has been filled, starts playing the media file. However, these processes may be quite slow, especially when using a low bandwidth connection.

One drawback of the prior art is that a user must purchase and install a supplemental live streaming media audio/video player on a personal computer, laptop computer, a personal assistant device or any other suitable computing device. It is also a draw back to have to wait for a large fixed length media file, especially when using a low bandwidth connection, before beginning the playback of the media file.

Another drawback is that the interconnections required to transfer conventional live streaming data between server and client are often prohibited by network security systems, making their use impossible.

SUMMARY OF THE INVENTION

In order to address the above and other drawbacks there is provided a method for transmitting a continuous live performance to a media client for rendering to a user via a data network. The method comprises acquiring the continuous live performance as a live stream of digital data and on receiving a request from the media client to transmit the live performance, commencing at a current point in the live stream of digital data, repackaging the stream of digital data into a media format compatible with the media client and transmitting the repackaged digital data to the media client via the data network. The media format comprises a data file having a virtually endless length.

There is also disclosed a system for providing a live performance to a media client via a data network. The system comprises a live stream source providing the continuous live performance as a live stream of digital data and a media server, the media server acquiring the live stream of digital data from the source, on receiving a request from the media client to transmit the live performance repackaging the stream of digital data into a media format compatible with the media client and transmitting the repackaged digital data to the media client via the data network. The media format comprises a data file having a virtually endless length.

DETAILED DESCRIPTION OF THE ILLUSTRATIVE EMBODIMENTS

A live stream and on demand media transcoder according to an illustrative embodiment of the present invention may be used to enable an audio/video player such as, for example, Macromedia's Flash Player™, to play MP3 (MPEG-I Audio Layer-3) or FLV (Flash Video) encoded live streams without having to either select, install, configure nor update any software or other plugin. As discussed above, presently, many audio/video player such as the Flash Player™ cannot be used to play live streaming as a fixed sized MP3 or FLV file is required.

It is to be understood that in the present specification the term "live" is meant to designate real-time broadcasts of live events as well as live audio or video signals such as, for example, live radio or television shows and live concerts. It is also to be understood that although in the present specification reference is made to MP3 and FLV audio and video formats, persons skilled in the art will appreciate that the present invention may also be applied to other audio and video formats.

Figure 1:
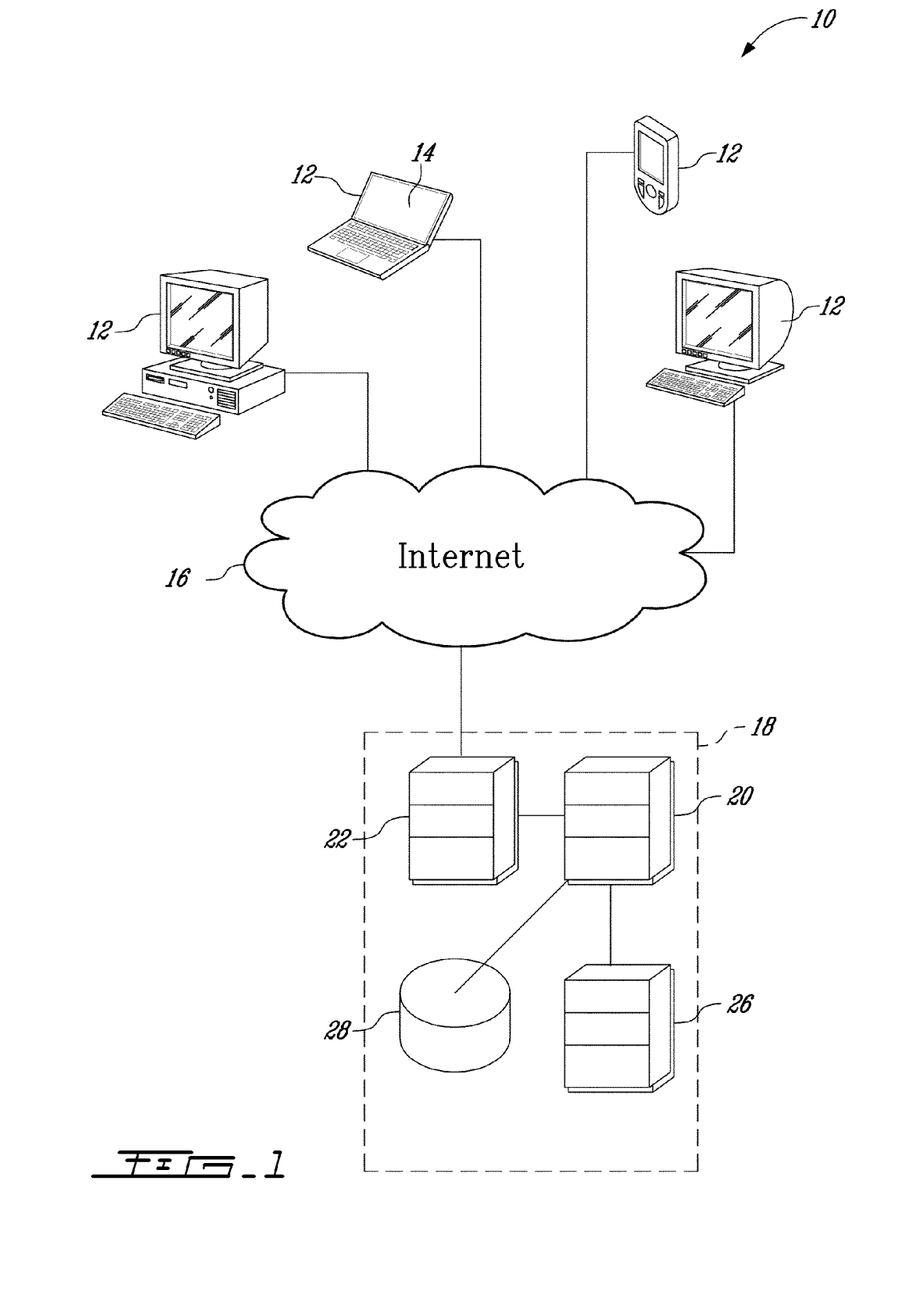
FIG. 1 is a schematic diagram of a live media serving system in accordance with an illustrative embodiment of the present invention.

Referring to FIG. 1, a live media serving system and method will now be described. A user using a personal computing device as in 12, such as a personal computer, laptop computer, personal assistant device or the like, and on which is installed a media client or application 14, for example an audio/video player such as Flash Player™, may access, via a communications network 16 such as the Internet or the like, a content provider system's 18 media serving device 20 through, for example, a link from a web page on a web server 22 via the Internet. The media serving device 20 serves as an interface to a live stream source 26 and may store statistical data relating to live streaming on a statistical database 28. The content provider system 18 may be a commercial radio station running, for example, a radio scheduling software such as RCSWorks. The personal computing device 12 may connect to the web server 22 using an Internet connection such as, for example, Ethernet (broadband, high-speed), wireless WIFI, cable Internet, etc.

The media serving device 20 implements processes, as will be discussed in more detail below, by which the internal header descriptions of a media file, such as an MP3 and FLV file, are transcoded in real time into a new header description so that it may be read by the audio/video player.

The web server 22 may optionally provide a user with login access to detailed statistical data, complete with graphs and charts, so that users may monitor any progress for their radio or television station, or may monitor their usage of on demand services.

Figure 2:
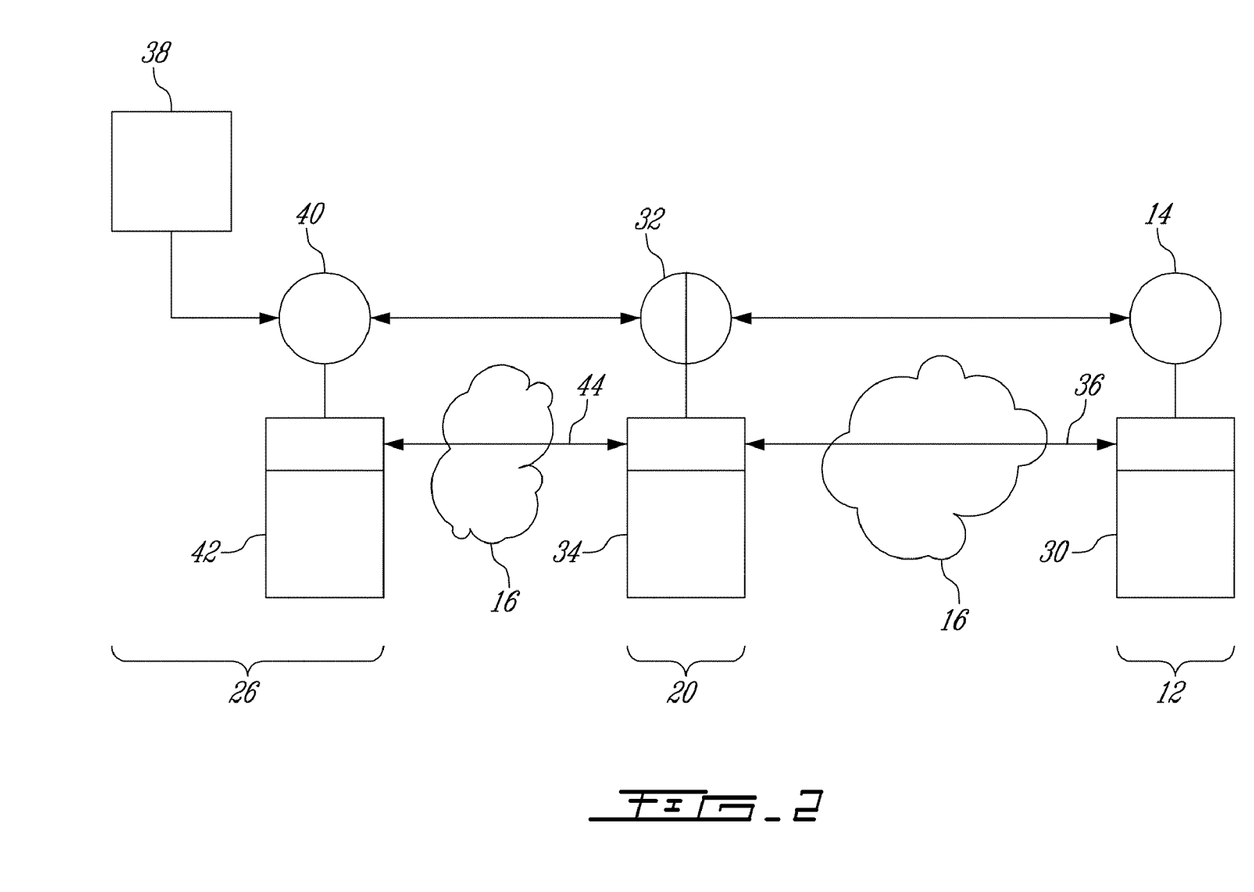
FIG. 2 is a communications diagram of a live media serving system in accordance with an illustrative embodiment of the present invention.

Referring now to FIG. 2, the personal computing device 12 is comprised of a medial client 14, typically in the form of a software application or module, which gains access to the communications network 16 via a standardized communications interface 30, such as a TCP/IP stack or the like. As known in the art, use of such a standardized communication interface 30 ensures that the personal computing device 12 is able to communicate with other parties, such as the media serving device 20, via the communications network 16.

Still referring to FIG. 2, the media serving device 20 is comprised of a media server 32, typically in the form of a software application or module, which gains access to the communications network 16 via a standardized communications interface 34, such as a TCP/IP stack or the like, for communicating with the media client 14. As will now be clear to a person of ordinary skill in the art, once an end-to-end communications connection 36 has been established between the media server 32 and the media client 14, for example using the TCP/IP protocol, data (typically in the form of data packets, not shown) can be exchanged.

The live stream source 26 illustratively comprises a live stream generation part 38 and a live stream generation part 40. Illustratively, the live stream generation part 38 and the live stream generation part 40 are applications running on the same system communicating via the internal communication channels of the system in question (all not shown). For example, in the case of a web based radio station the live stream generation part 38 could be an application which automatically creates a live audio stream from a plurality of stored media files, for example MP3 audio files or the like, based on a play list. Alternatively, the live stream generation part 38 would comprise appropriate hardware and software to acquire and convert a live broadcast (such as talk radio) into a live audio stream.

Still referring to FIG. 2, the live stream acquisition part 40 illustratively acquires the live streaming video from the live stream generation part 38. As discussed in part above, the live stream generation part 38 could be, for example, a live radio or television broadcast associated with the content provider system 18 and converted into a suitable digital format for live streaming to the live stream acquisition part 40. The live stream source 26 further comprises a standardized communications interface 42, such as a TCP/IP stack or the like. The live stream generation part 40 uses the communications interface 42 to interconnect with the media server 32, illustratively through an end-to-end communications connection 44 established between the live stream acquisition part 40 and the media server 32 over the communications network 16.

Still referring to FIG. 2, the media server 32 and the live stream acquisition part 40 and their respective communications interfaces 34, 42, could be implemented, for example, as applications executing on computer hardware (not shown).

Figure 3:
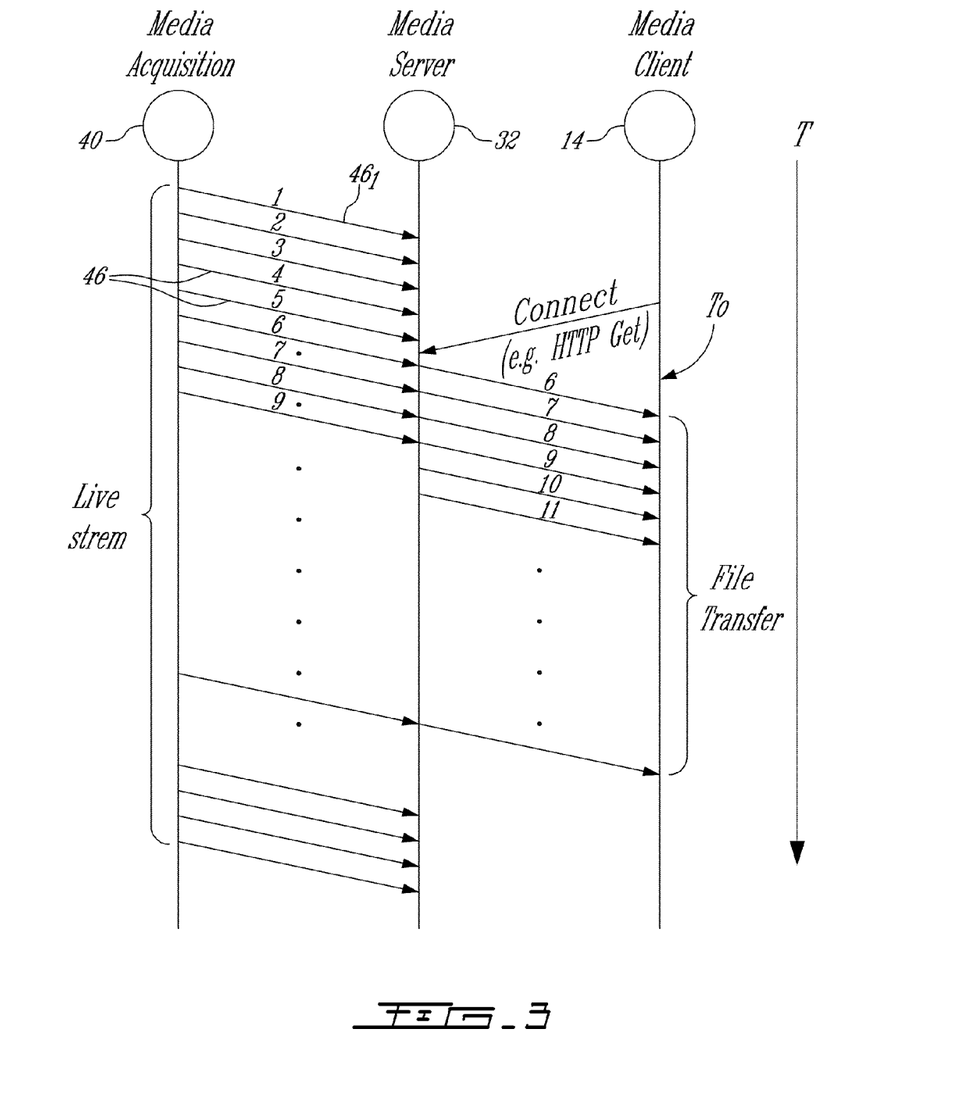
FIG. 3 is a schematic diagram of the flow of data in a live media serving system in accordance with an illustrative embodiment of the present invention.

Referring now to FIG. 3 in addition to FIG. 2, once the end-to-end communications connection 44 is established between the live stream acquisition part 40 and the media server 32, a live stream such as an MP3 audio stream or FLV (Flash Video) stream is transmitted from the media generation part 40 to the media server 32 as a stream of digital data, typically in the form of a series of media data packets 46. The initial media data packet(s) 46$_1$ typically include headers comprising information related to the live stream which is stored by the media server 32 for subsequent transmission to the media client 16. A media client 14 wishing to receive a particular live stream connects with the media server 32, for example using an HTTP Get including an appropriate URL referencing the particular live stream, or mountpoint, on the media server 32.

Figure 4A:
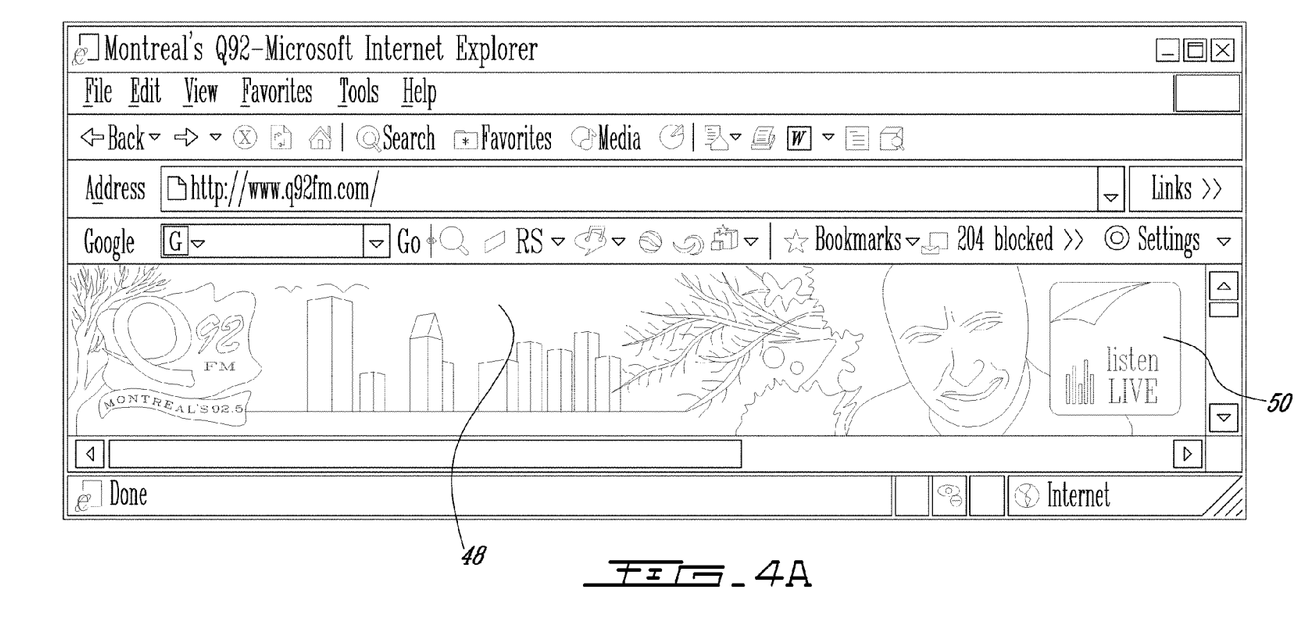
FIGS. 4A and 4B provide illustrations of web sites for accessing a live media serving system in accordance with an illustrative embodiment of the present invention.

Referring now to FIG. 4A in addition to FIG. 3, this is illustratively done by positioning, on a page 48 of the content provider's web site, an appropriate illustrative icon 50 which is associated with an appropriate hyper link. For example, for a live stream generated by an online radio broadcasting system the icon would typically indicate that the user can listen to the broadcast by selecting the icon/button in question. Selecting the icon/button would launch the media client 16 which would subsequently initiate an HTTP connection with the media server 32. Typically, this involves establishment of a TCP/IP connection between the media client 16 and the media server 32 on a known port which is used to transmit an HTTP Get. Once the TCP/IP connection has been established, the HTTP Get is transmitted to the media server 32 together with information as to the stream. Typically this information is in the form of a mountpoint to which the media client 16 will be connected in order to receive, as will be discussed in more detail below, the repackaged live stream.

One advantage of the above method is that it is largely immune to the effects of network security devices such as fire walls and the like which, as pointed out in the background to the invention, in many cases prevent the reception of live streaming media. Indeed, live streaming applications typically use dedicated and identifiable protocols to transmit the live streaming data from the media server 32 to the media client 16, such as Real-Time Streaming Protocol (RTSP) of the like, which are often (easily) blocked by corporate firewalls. On the other hand, HTTP over a TCP/IP connection is typically necessary for the correct operation of any web browser, and therefore is a configuration typically allowed by the vast majority of corporate firewalls.

Referring back to FIG. 3, once the TCP/IP connection has been established between the media client 16 and the media server 32, the media server 32 starts to transmit the contents of the live stream commencing at the current point in time. In this regard, and as illustrated, if the user initiates the connection at a current point in time $T_0$ sometime after the start of the live stream, the media server 32 will commence transmission of the contents of the live stream at this current point in time $T_0$. Thus a second media client 16 which initiates an HTTP connection with the media server 32 at a point in time later than a first media client 16 will receive a transmission comprising a portion of the live stream commencing at a time later than the first media client 16.

Additionally, the media server 32 repackages or adapts the live audio stream such that the audio/video player 52 believes it is playing a conventional media file of either great length (such that the end of the file is virtually unreachable) or of indeterminate length. This includes as necessary the generation or transcoding of the headers as well as the transcoding of the live audio stream to a format which is appropriate for the type of media client 16 requesting the file. Using HTTP, indication of an indeterminate length can be undertaken by simply omitting the content length in any response to the HTTP Get.

Still referring to FIG. 3, the transmission can be terminated by simply terminating the TCP/IP connection, for example when the user selects a stop button/icon 54 on the audio/video player 52. In general, therefore, the media server 32 acts as a relay between the live stream generation part 38 and the media client(s) as in 16, providing appropriate headers and where necessary conversion to the live stream such that the media client(s) as in 16 are led to believe they are receiving a conventional media data file. In this regard, for example advantage is taken of either a file type having an unknown length, a file type having a length which is virtually endless, that is the file size is sufficiently large that during the transmission the end of the file will almost never be reached, or based on a predetermined typical length of time that a user would view such a live performance.

Audio/Video Player Accessing Live Streams

Figure 5:
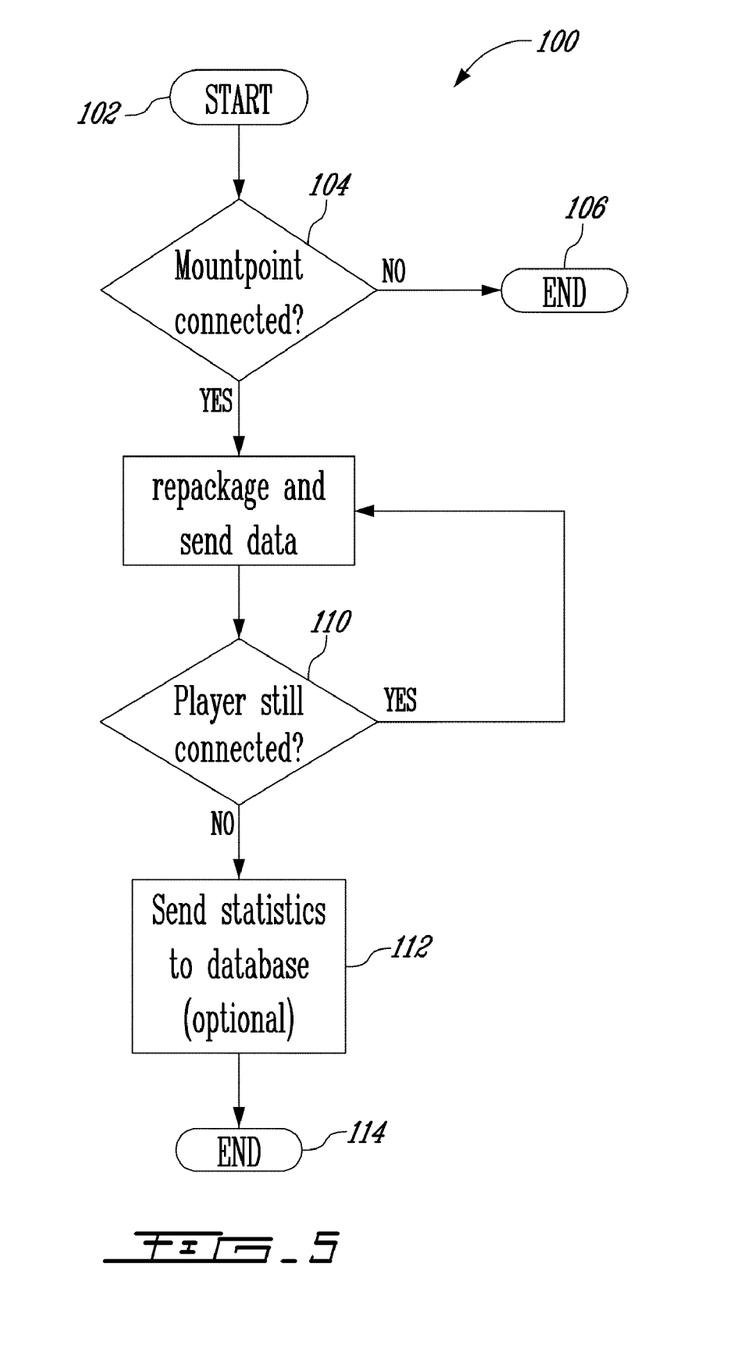
FIG. 5 provides a flow chart of a live media serving system in accordance with an illustrative embodiment of the present invention.

Referring now to FIG. 5, a flow chart of an illustrative example of a process 100 executed by an audio/video player accessing live streams provided by a content provider's system 18 is disclosed. Live streams include, for example, live television, live radio shows or the like. The steps of the process are indicated by blocks 102 to 114.

The process starts at block 102 where the user connects to a content provider 18 through, for example, a web page on the web server 22, using a personal computing device 12 on which the audio/video player is installed.

As discussed above, the user typically activates a hyperlink (reference 48 in FIG. 4A) on the web server 22, which redirects the user to the media server 32. In a particular embodiment the web server 22 could provide a plurality of user selectable links 50, each link 50 providing redirection to the live stream at one of a plurality of different data rates (not shown), thereby allowing the user to select an appropriate one for the user's equipment and data connection.

Figure 4B:
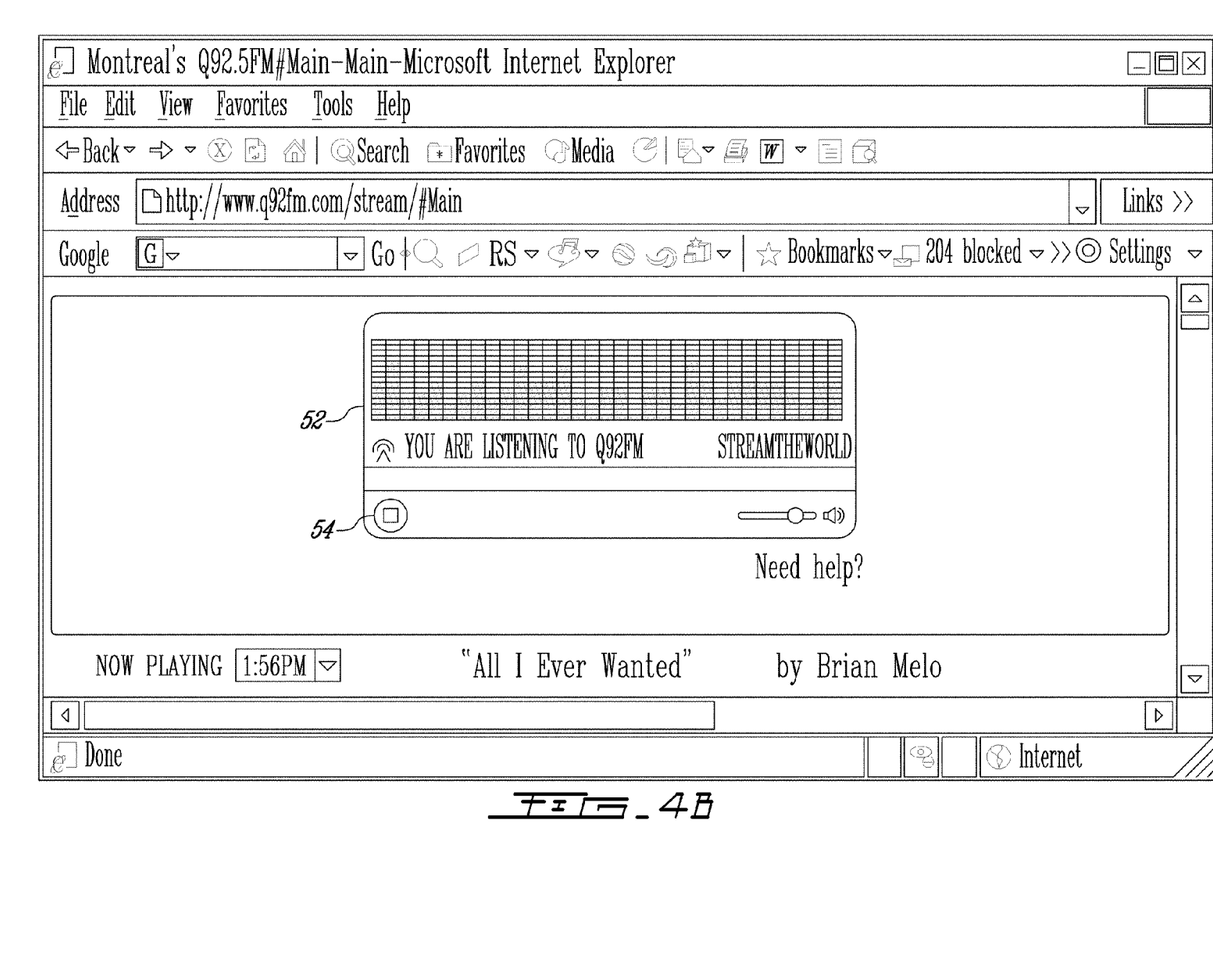

The media server 32 provides pertinent live stream information to the audio/video player (reference 52 in FIG. 4B), which is automatically started. This information may comprise, for example, the mountpoint of the requested live stream on the live stream source and a server streaming ID. The process then proceeds to block 104.

At block 104, the media server 32 verifies if the live stream acquisition part 40 is connected to the live stream mountpoint requested by the user. If not, then the process exits at block 106 and the media server 32 disconnects the user. If the live stream acquisition part 40 is connected at the live stream mountpoint requested by the user then the process proceeds to block 108 where the media server 32 commences repackaging the live stream data (the repackaging process will be described further on) and then provides the repackaged live stream data to the audio/video player 52.

Still referring to FIG. 5, the media server 32 continues to deliver the transcoded live stream data to the audio/video player 52 until such time as the end-to-end communications connection 36 between the media client 16 and the media server 32 is disconnected, for example by selecting the stop button/icon 54.

If the communications connection 36 is disconnected then, at block 112, the media server 32 may optionally send statistical information about the live stream access, for example length of connection, number of bytes sent, etc., to the optional statistical database 28. The process then proceeds to block 114 where the media server 32 memory assigned to the live stream is cleared and verification is made to make sure that the communications connection 36 is properly closed.

Note, it is to be understood that the live stream server may be designed or adapted so as to handle other audio and video types in addition or instead of MP3 and FLV. It is to be noted that even though the audio/video player used as an example herein is Macromedia's Flash Player™, other audio/video players may also be used.

Although the present invention has been described by way of a non-restrictive illustrative embodiment and example thereof, it should be noted that it will be apparent to persons skilled in the art that modifications may be made to the illustrative embodiment without departing from the spirit and the scope of the present invention.

What is claimed is:

1. A method for transmitting a continuous live performance to a plurality of media clients via a data network for rendering to a respective user, the method comprising:

acquiring the continuous live performance as a live stream of digital data; and on receiving a request from a given one of the media clients to transmit the live performance, commencing at a current point in said live stream of digital data, repackaging said stream of digital data into a media format compatible with the given media client and transmitting said repackaged digital data to the given media client via the data network;

wherein said media format comprises a data file identified by the given media client as having a length so that it appears to the given media client that the media format is a non-streaming media format, wherein said length is indicated by one of either omitting a header field indicating length or indicating said length is greater than a length required to coincide with a duration of the live performance.

2. The method of claim 1, wherein said live stream of digital data is comprised of a substantially continuous stream of data packets and further wherein repackaging said stream of digital data commences with a current data packet selected from said substantially continuous stream of data packets, said current data packet comprising a portion of said live stream of digital data having a time of generation equal to said current point.

3. The method of claim 2, further comprising discarding data packets comprising a portion of said live stream having a time of generation older than said current point.

4. The method of claim 1, wherein said media format is MPEG.

5. The method of claim 1, wherein said length is greater than a length required to coincide with a predetermined viewing time.

6. The method of claim 1, further comprising providing a hyper link on a web site, said hyperlink comprising a URL comprising a command to launch the given media client and a mountpoint and wherein said request is generated on selection of said URL by said respective user, said request including said mountpoint.

7. A system for providing a live performance to a plurality of media clients via a data network, the system comprising:

a live stream source providing the continuous live performance as a live stream of digital data; and a media server device, said media server device acquiring said live stream of digital data from said live stream source, on receiving a request from a given one of the media clients to transmit the live performance and commencing at a current point in said live stream of digital data, repackaging said stream of digital data into a media format compatible with the given media client and transmitting said repackaged digital data to said given media client via the data network wherein said media format comprises a data file identified by the given media client as having a length so that it appears to the given media client that the media format is a non-streaming media format, wherein said length is indicated by one of either omitting a header field indicating length or indicating said length is greater than a length required to coincide with a duration of the live performance.

8. The system of claim 7, wherein the data network comprises the Internet and a local area network on which the given media client is located, and further comprising a firewall positioned between the internet and the local area network, said firewall configured to prevent said live stream of digital data from being accessible via the local area network.

9. The system of claim 7, wherein said live stream of digital data is comprised of a substantially continuous stream of data packets and further wherein repackaging said stream of digital data commences with a current data packet selected from said substantially continuous stream of data packets, said current data packet comprising a portion of said live stream of digital data having a time of generation equal to said current point.

10. The system of claim 9, wherein said media server device discards data packets comprising a portion of said live stream having a time of generation older than said current point.

11. The system of claim 7, wherein said media format is MPEG.

12. The system of claim 7, wherein said length is greater than a length required to coincide with a predetermined viewing time.

13. The system of claim 7, further comprising providing a hyper link on a web site, said hyperlink comprising a URL comprising a command to launch said given media client and a mountpoint and wherein said request is generated on selection of said URL by a user of said given media client, said request including said mountpoint.

* * * * *